United States Patent [19]
Kantner et al.

[11] Patent Number: 5,518,416
[45] Date of Patent: May 21, 1996

[54] REVERSIBLE DUAL MEDIA ADAPTER CABLE

[75] Inventors: Edward A. Kantner, Raleigh; Kenneth D. Schultz, Cary, both of N.C.

[73] Assignee: International Business Machines Corporation, Armonk, N.Y.

[21] Appl. No.: 332,681

[22] Filed: Nov. 1, 1994

Related U.S. Application Data

[63] Continuation of Ser. No. 149,885, Nov. 12, 1993, Pat. No. 5,387,110.

[51] Int. Cl.⁶ .................................................. H01R 29/00
[52] U.S. Cl. ............................................................ 439/352
[58] Field of Search ...................... 439/352, 353; 403/315, 316

[56] References Cited

U.S. PATENT DOCUMENTS

| | | | |
|---|---|---|---|
| 2,049,093 | 7/1936 | Thorin | 173/361 |
| 4,083,619 | 4/1978 | McCormick et al. | 439/352 X |
| 4,258,969 | 3/1981 | Stallard | 339/14 P |
| 4,362,348 | 12/1982 | Stephenson et al. | 439/352 |
| 4,370,013 | 1/1983 | Niitsu et al. | 439/352 |
| 4,694,544 | 9/1987 | Chapman | 403/316 |
| 5,087,207 | 2/1992 | Byrne | 439/215 |
| 5,118,312 | 6/1992 | Lu | 439/676 |
| 5,387,110 | 2/1995 | Kantner et al. | 439/59 |

Primary Examiner—Kenneth J. Ramsey
Attorney, Agent, or Firm—Joscelyn G. Cockburn

[57] ABSTRACT

An adapter cable and card for interfacing a personal computer to a local area network or other type of computer network which can operate on either of two types of media. The cable uses a symmetrical plug connector which mates with a receptacle connector on the adapter card in either a first position, or a second position which is 180 degrees rotated from the first position. In the first position, signal lines for one type of media are connected and signal lines for the other type of media are disconnected. In the second position, signal lines for the second type of media are connected, and signal lines for the first type are disconnected. The disconnection of the unused conductors allows the drive circuits for unused type of media to remain active without causing electromagnetic interference problems.

5 Claims, 3 Drawing Sheets

REVERSIBLE DUAL MEDIA ADAPTER CABLE

This is a continuation of application Ser. No. 149,885, filed Nov. 12, 1993 and now U.S. Pat. No. 5,387,110.

BACKGROUND

1. Field of the Invention

This invention relates to the way a personal computer is interfaced to shared-local area network (LAN) wiring such as might be installed in an office building. It is particularly useful with portable and laptop computers.

2. Prior Art

Currently, the personal computer user connects his or her computer to the LAN by installing in the computer a LAN adapter card which includes a "pin-and-socket" input/output (I/O) receptacle connector and subsequently connecting between this receptacle connector and the LAN wiring an adapter cable assembly. The adapter cable has on one end, a pin-and-socket plug connector which mates with the receptacle connector on the adapter card, and on the other end a connector which plugs into a wall plate socket which is in turn connected to the LAN wiring installed in the building. The personal computer can be moved from room to room if necessary by simply unplugging the adapter cable, and plugging it in in a different room.

The above scheme becomes more complicated if the user wants to move his or her computer from building to building and the LAN of choice can be operated on two or more different kinds of wiring with different impedance characteristics and wall connectors. For example, the token ring local area network can be operated on shielded twisted pair media or unshielded twisted pair media. Each type of media requires its own drive and receive circuits on the adapter card because each has different impedance and drive characteristics. Users of small notebook or laptop personal computers which are equipped to connect to the token ring LAN are likely to encounter both kinds of wiring as they go to meetings in different buildings, possibly in different geographic areas or even different countries. In the current art, such users are accommodated in one of two ways.

In one scheme, drive circuits for both types of media are kept active and brought out to pins or sockets of the receptacle connector of the adapter card. The user is supplied with two adapter cables. On one the appropriate network wall plug is wired to the appropriate pins or sockets on the plug connector to connect to one type of media; on the other the second type of network wall plug is wired to the appropriate pins or sockets on the plug connector for the other media. The user simply switches adapter cables to switch between different types of LAN media. This scheme works, but the user has to carry two adapter cables. Additionally, the supplier of the LAN adapter card for the personal computer has the added cost of supplying two cables.

In the second scheme, the user is supplied with one adapter cable. The signal conductors and ground conductors for both types of media are wired into the cable and connected to pins or sockets on the plug connector which mate with appropriate pins or sockets on the receptacle connector on the adapter card. Both network wall plug connectors are wired to the other end of the adapter cable. The user can leave the one adapter cable connected to his or her personal computer and plug in whichever network connector is needed. The problem with this system is that both sets of signal wires in the adapter cable cannot remain active at the same time. If they are, the unused and unterminated set of signal wires will give off high levels of electromagnetic emissions, and potentially prevent the system from complying with Federal Communications Commission regulations restricting such emissions. The unterminated wires will also disrupt the transmission line properties of the adapter cable, making the whole system susceptible to incoming electromagnetic interference, return loss from reflected signals on the unterminated lines, jitter and similar problems. In the current single-cable scheme therefore, a relay must be provided on the adapter card to switch between the two different sets of media signal wires in the adapter cable. This relay takes up space in the adapter card and adds expense. It also adds complexity in that the relay must be controlled through software or some type of manual intervention by the user.

What is needed is a way to provide a single adapter cable with good electromagnetic characteristics that can be used with either of two types of media. Such an adapter cable can be made by taking advantage of the inherent switching capability possessed by a symmetrical connector with multiple sets of contacts. U.S. Pat. No. 5,118,312 to Lu, for example, discloses a wall-plate telephone-style connector with two sets of contacts that can be used to switch a single telephone line. Lu, however, provides no way to disconnect the unused telephone line, or to maintain the transmission line characteristics of the line.

SUMMARY

The present invention meets the above needs through judicious wiring of a receptacle pin-and-socket connector on an adapter card and a plug pin-and-socket connector on an adapter cable. The connector pair is designed to be plugged together in either of two positions, the second position having one connector rotated 180 degrees from the first position; that is, the connector pair is not "keyed" in any way and is mechanically symmetrical. A user can unplug the plug connector at any time, turn it "upside down," and plug it back in.

For purposes of this disclosure, the pin-and-socket connector piece mounted on the adapter card is called a "receptacle connector" and the pin-and-socket connector piece attached to the adapter cable is called a "plug connector." It is understood that either connector could be formed to appear as a "male" connector with the other appearing as a "female" connector. It is also understood that either connector could contain the "pin" contacts, with the other containing the "socket" contacts. It is further understood that, for purposes of this disclosure, the word "contact" and the word "contacts" when used without qualification are used to refer to both pin contacts and socket contacts.

In the preferred embodiment, the complete system comprises first a conventional adapter card, having circuitry for communicating between the computer and the LAN using either of two LAN media, and a bus connector. In this embodiment, the adapter card is built around a printed circuit board, but some other type of wiring technology could be used, as long as signal and ground traces are made available for connecting the appropriate connectors. For purposes of this disclosure, the phrase "electronic module" is understood to refer to the piece on which the circuitry is assembled. The receptacle connector is mounted on the adapter card so that the receptacle connector is accessible when the card is plugged into the bus of a personal computer.

This system is most useful with small laptop or notebook computers, and so the adapted card would most likely be the "credit card" type, with a form factor like the conventional PCMCIA cards. The invention would however work and be useful with conventional adapter cards designed for desktop systems. The receptacle connector has a plurality of pins or sockets arranged symmetrically about the axial center of the connector, where the "axis" runs parallel to the pins. Thus the connector is effectively divided into two symmetrical halves. The card is wired so that some of the connections for each of two sets of drive/receive circuits are made to one half of the connector and some of the connections are made to the other half. However, each signal trace is wired so that its pin or socket does not symmetrically oppose another signal trace's pin or socket, but rather is connected to a pin or a socket which is symmetrically opposed to an unconnected pin or socket. The frame grounds are arranged so that at least some of their pins or sockets are directly opposite each other and will interface with the plug connector grounds no matter how the connectors are mated.

The system further comprises the adapter cable. The bulk electrical cable used has at least two independent sets of conductors, each set carrying the signals and grounds for a different type of LAN media. A plug connector which mates with the above described receptacle connector is affixed to the cable. The plug connector is symmetrical about a center axis. The pins or sockets in the plug connector are connected to the signal conductors in the electrical cable so that each conductor's pin or socket symmetrically opposes an unconnected pin or socket. Furthermore, the signal conductors are connected so that one set will be electrically connected to the appropriate signal traces on the adapter card and the other set will be disconnected when the adapter cable is plugged into the receptacle connector in the first position. When the plug connector is pulled out, turned over, and reinserted in the second position, the previously unconnected set of signal conductors will now be connected to its appropriate signal traces through the plug and receptacle connectors, and the previously connected set will be disconnected. The ground conductors in the electrical cable will be connected to pins or sockets so that they will always be connected to ground traces when the plug connector is inserted in either the first position or the second position.

Although the inventive concept is functionally complete as described above, in most cases, the adapter cable is supplied with the appropriate LAN wall connectors already connected to the opposite end of the adapter cable from the plug connector. One LAN connector is connected to one set of signal conductors for use with one type of LAN media, and a second LAN connector would be connected to the other set for use with another type of LAN media. For example, one LAN connector might be for use with unshielded telephone type wire and might be an RJ type telephone connector; the other might be for use with shielded twisted pair, and may be a connector that provides for connection to shielded token ring type cable. It should also be noted that the single electrical cable with two sets of conductors inside could be replaced with two electrical cables, each containing only one set of conductors.

To switch from one LAN media to another, a user simply disengages the plug connector of the adapter cable, turns it over, and plugs it back in. The unused set of transmit/receive circuits can remain active and there will be no electromagnetic compatibility or transmission line problems because they will be disconnected at the plug/receptacle connector interface.

BRIEF DESCRIPTION OF THE DRAWINGS

FIG. 1A shows a top view, and FIG. 1B shows a view looking into the sockets.

DETAILED DESCRIPTION

This invention requires, first, a reversible connector pair in which the plug connector can be engaged in either of two positions. Connectors that can be engaged in more than one position are known in the art. U.S. Pat. No. 4,781,610 to Mercer discloses a connector block, the orientation of which can be changed to change the voltage of a three-phase electrical device. U.S. Pat. No. 5,087,207 to Byrne discloses another connector arrangement in which the orientations of the mating parts are changed to alter the voltage. Lu, previously mentioned, discloses a wall plate telephone style connector into which a plug with a single set of signal wires can be inserted in either one of two orientations.

Figure 1A:
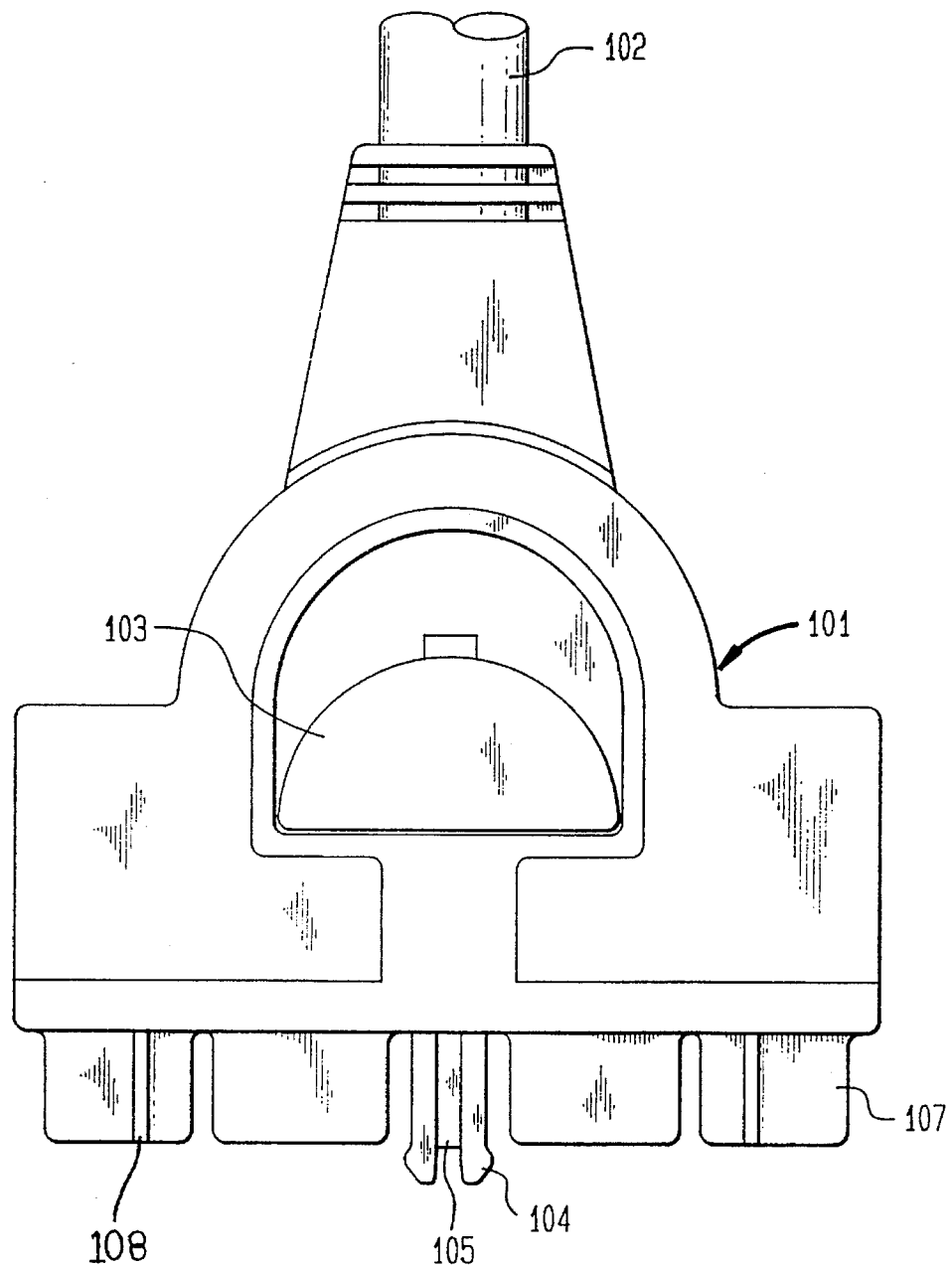
FIGS. 1A and 1B show the plug connector that is used in one embodiment of this invention.

We have chosen the plug connector of FIG. 1 for our embodiment. FIG. 1A shows one view. A cable 102, containing the appropriate signal and ground wires, enters the connector body 101 and the individual conductors are fastened in a conventional manner to sockets which are housed in a narrow extension 107. The extension 107 slides inside a receptacle connector on an adapter card when the connectors are engaged. This plug connector also has a locking mechanism by which the user can slide a thumb actuator 103 forward, and thus push a solid bar of material, 105, in between two deflection arms, 104, the deflection arms having to be deflected by the sides of a hole in the mating receptacle connector when the connectors are engaged and disengaged. The bar 105 prevents the deflection of the arms and thus serves as a retaining mechanism.

Figure 1B:
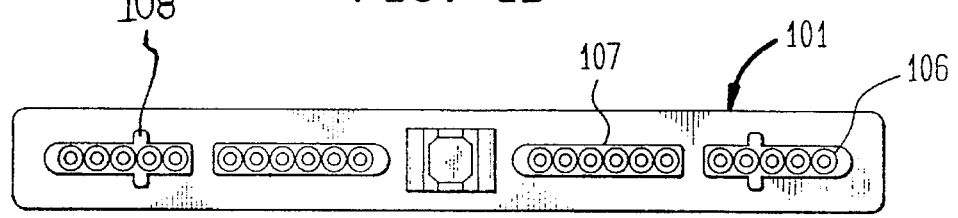

FIG. 1B shows an end view of the plug connector, looking into the sockets. The sockets are designated 106. The housing and narrow extension are designated as in FIG. 1A. It should be noted that the connector is completely symmetrical along its width; it is not "keyed" and can be engaged in either of two positions, one being 180 degrees rotated from the other around the axis of the solid bar 105 used in the retaining mechanism. The fins, 108, are symmetrical and serve only to prevent lateral motion when the plug connector is partially inserted. Such motion might cause the pins of the receptacle connector to bend. It should also be noted that pins could be used in the plug portion instead of sockets, and indeed, that a completely different style of connector could be used as long as the symmetry is maintained.

Figure 2:
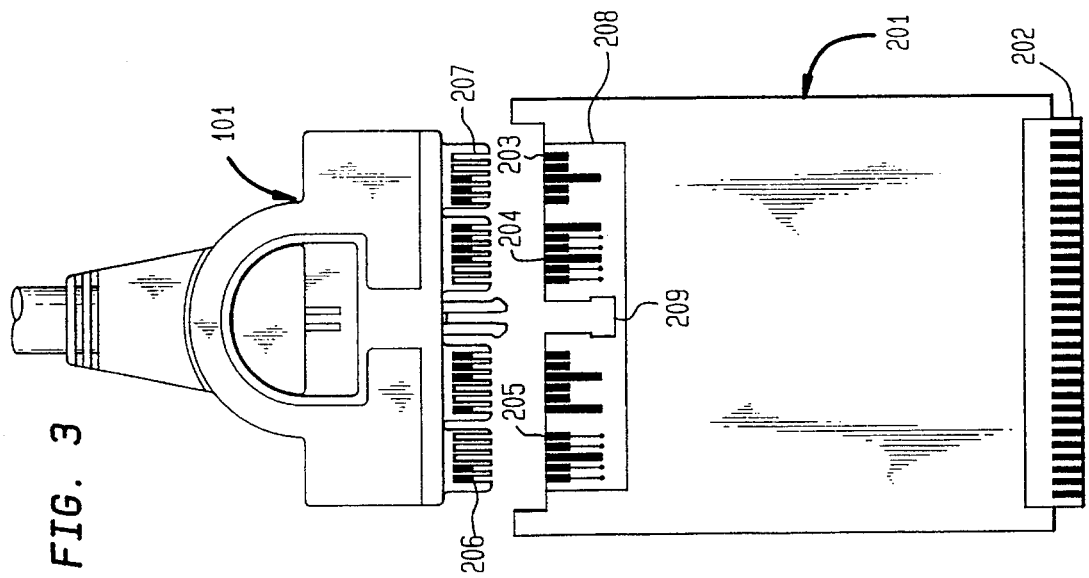
FIG. 2 shows the plug connector of FIG. 1 positioned to mate with a receptacle connector on an adapter card. The plug connector and the receptacle connector on the card are shown with the pin and socket connections exposed.

FIG. 2 shows the plug connector disclosed above together with an adapter card 201 on which is mounted a mating receptacle connector. In the present embodiment, the invention is used to interface a computer to the IBM Token Ring LAN which can run on either shielded twisted pair or unshielded twisted pair media. The connectors are shown situated to mate in a first position, wherein, in the present embodiment, unshielded twisted pair connections are made and cable conductors for shielded twisted pair are unconnected. The receptacle connector has an opening 209 to receive the deflection arms of the plug connector. The receptacle connector housing 208 is shown as "see-through" so that the circuit connections are revealed, but for simplicity, the pins themselves are not shown. The portion of the plug connector that houses the sockets is shown see-through so that the sockets are visible. A bus connector 202 mounted on the adapter card interfaces the adapter card to the host computer.

An example of a pin connection to a signal trace on the adapter card is shown at 205. A ground connection is shown at 204, and an unconnected pin trace is shown at 203. For the plug connector, an example of a connection to a socket is shown at 206 with partial shading whereas an unconnected socket is shown with an open depiction as at 207.

Figure 3:
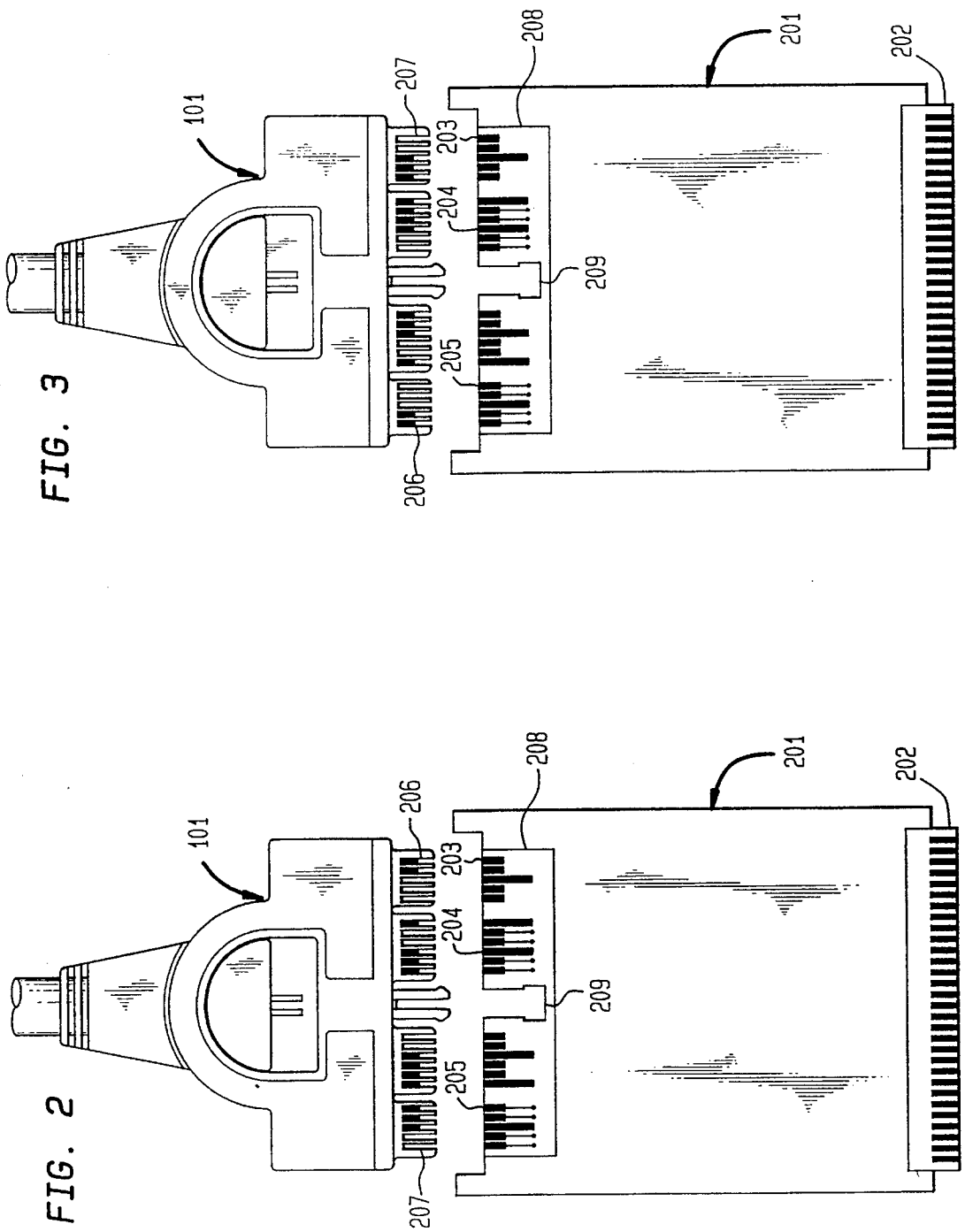
FIG. 3 shows the same plug connector and adapter card as FIG. 2, except that the plug connector is flipped 180 degrees from its position in FIG. 2.

FIG. 3 is identical to FIG. 2, except that the plug connector body 101 has been rotated 180 degrees or "flipped over." With the plug connector flipped over the connectors are situated to mate in a second position, wherein, according to the present embodiment, the shielded twisted pair connections are made, and the cable conductors for unshielded twisted pair are unconnected.

FIGS. 2 and 3 are clarified by the following wiring tables. There are 22 pin and socket connections in the present embodiment. Pin 22 in the tables-is the pin matching the connection designated as 203 in the drawings. In the table, STP stands for "Shielded Twisted Pair" and UTP stands for "Unshielded Twisted Pair."

| CARD WIRING | | CABLE PLUG SOCKETS |
|---|---|---|
| Signal | Pin Number | Signal Conductor |
| FIG. 2 Wiring Arrangement First Position - for UTP Operation | | |
| STP Receive B | 1 | No Connection |
| STP Receive A | 2 | No Connection |
| Frame Ground | 3 | Cable Shield/Ground |
| UTP Receive B | 4 | UTP Receive B |
| UTP Receive A | 5 | UTP Receive A |
| Frame Ground | 6 | Cable Shield/Ground |
| No Connection | 7 | STP Transmit A |
| No Connection | 8 | STP Transmit B |
| Frame Ground | 9 | Cable Shield/Ground |
| No Connection | 10 | No Connection |
| No Connection | 11 | No Connection |
| CENTER OF CONNECTORS | | |
| UTP Transmit B | 12 | UTP Transmit B |
| UTP Transmit A | 13 | UTP Transmit A |
| Frame Ground | 14 | Cable Shield/Ground |
| STP Transmit B | 15 | No Connection |
| STP Transmit A | 16 | No Connection |
| Frame Ground | 17 | Cable Shield/Ground |
| No Connection | 18 | No Connection |
| No Connection | 19 | No Connection |
| Frame Ground | 20 | No Connection |
| No Connection | 21 | STP Receive A |
| No Connection | 22 | STP Receive B |
| FIG. 3 Wiring Arrangement "Flipped Over" into Second Position - for STP Operation | | |
| STP Receive B | 1 | STP Receive B |
| STP Receive A | 2 | STP Receive A |
| Frame Ground | 3 | No Connection |
| UTP Receive B | 4 | No Connection |
| UTP Receive A | 5 | No Connection |
| Frame Ground | 6 | Cable Shield/Ground |
| No Connection | 7 | No Connection |
| No Connection | 8 | No Connection |
| CARD WIRING | | CABLE PLUG SOCKETS |
| Signal | Pin Number | Signal Conductor |
| Frame Ground | 9 | Cable Shield/Ground |
| No Connection | 10 | UTP Transmit A |
| No Connection | 11 | OTP Transmit B |
| CENTER OF CONNECTORS | | |
| UTP Transmit B | 12 | No Connection |
| UTP Transmit A | 13 | No Connection |
| Frame Ground | 14 | Cable Shield/Ground |
| STP Transmit B | 15 | STP Transmit B |
| STP Transmit A | 16 | STP Transmit A |
| Frame Ground | 17 | Cable Shield/Ground |
| No Connection | 18 | UTP Receive A |
| No Connection | 19 | UTP Receive B |
| Frame Ground | 20 | Cable Shield/Ground |
| No Connection | 21 | No Connection |
| No Connection | 22 | No Connection |

Note that regardless of whether the adapter cable plug connector is oriented in the first position or the second position, the five cable grounds are connected. Also note that the unused signal wires are all disconnected by virtue of their being a "No Connection" on the adapter card or a "No Connection" on the cable plug connector.

Figure 4:
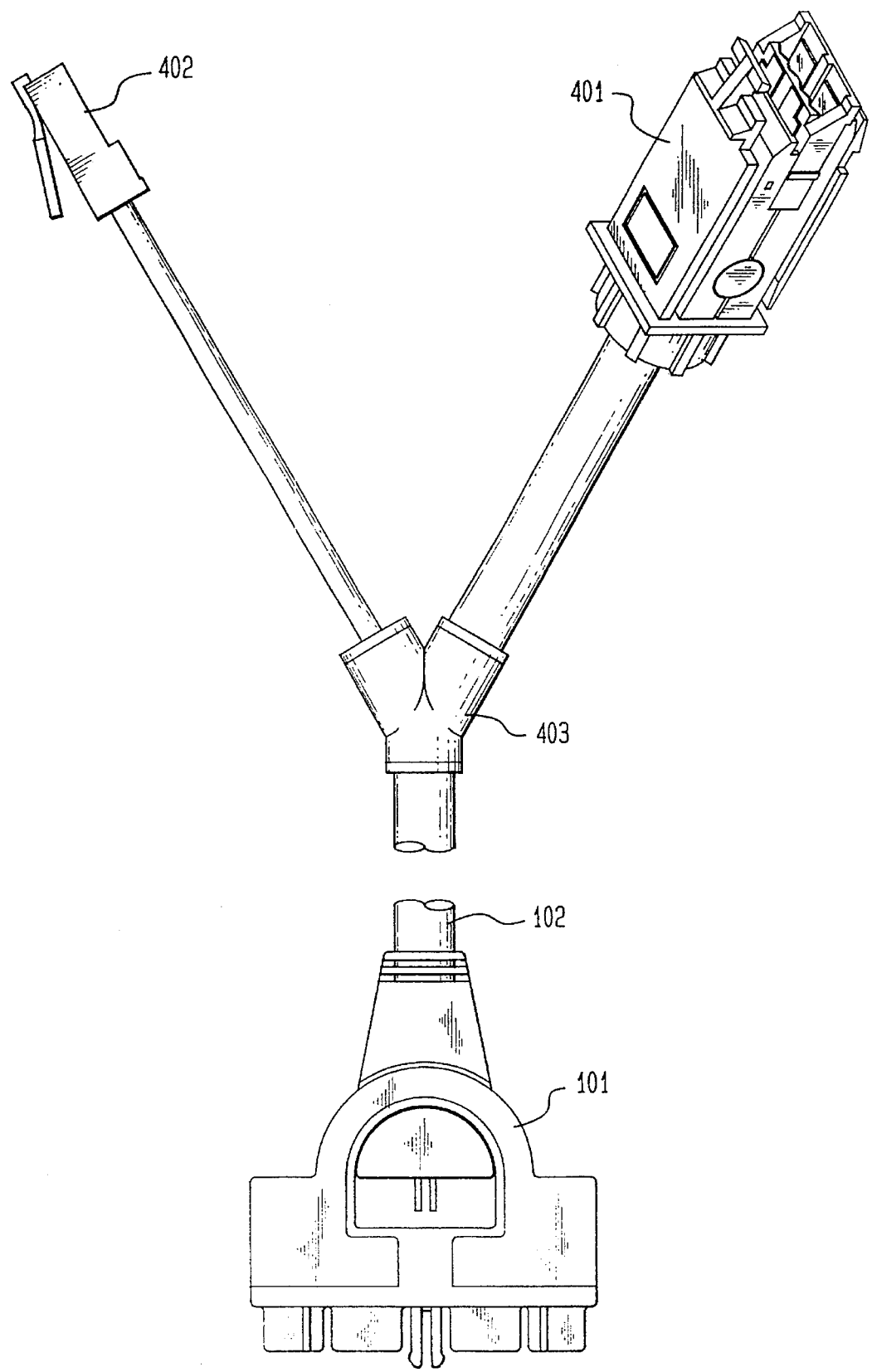
FIG. 4 shows the complete adapter cable assembly of the present embodiment of the invention.

FIG. 4 shows the complete adapter cable used to interface to the token ring LAN running either shielded or unshielded twisted pair media. The body of the previously discussed plug connector 101 is on one end of the "Y" cable, 102. A plastic boot 403 provides strain relief where the cable splits into two cables. The side of the Y with conductors for shielded twisted pair is connected to a commonly known token ring network connector 401. The unshielded twisted pair side is connected to a commonly known RJ45 network connector 402. When the plug connector 101 is plugged into the adapter card in the first position, the RJ45 connector is active. When it is rotated to the second position and plugged in, the token ring connector is active.

While we have shown an embodiment of our invention for use in a LAN system such as the IBM Token Ring wherein one media is shielded twisted pair and the other media is unshielded twisted pair, the invention is not limited to this environment. A reversible adapter cable such as the one described could be used to switch between two completely different kinds of networks or between other types of media with other types of network connectors. Also, instead of a "Y" cable, a single cable with a connector block having two network connectors could be used and the operation of the invention would be the same.

We claim:

1. In an electrical connector having a first connector section for mating with a second connector section to couple a business machine to a communications network, said first connector section comprising:

a housing having a plurality of electrically conductive contacts therein for mating with electrically conductive contacts in the second connector section when said first connector is brought into mating relation with said second connector section;

a pair of spaced deflecting arms mounted on the housing, with each one of the pair of spaced deflecting arms having an enlarged section at its free end for contacting a groove positioned within the second connector section;

a thumb actuator movably mounted to said housing;

a rod connected to the thumb actuator;

said thumb actuator operable to be moved to a first position whereat the deflecting arms are held firmly by said rod against the groove to lock the first connector section and the second connector section together and operable to be moved to a second position whereat the deflecting arms are free to deflect from the groove to place the first connector section and the second connector section in an unlock state.

2. The electrical connector of claim 1 wherein the first connector section includes a plug connector.

3. The electrical connector of claim 1 wherein the first connector includes a receptacle connector.

4. The electrical connector of claim 1 further including a cable (102) with a plurality of conductive wires operatively connected at one end to the plurality of conductive contacts in said housing; and another connector connected to another end of said plurality of conductive wires.

5. An electrical connector section comprising:

a housing having a plurality of electrically conductive contacts therein;

a pair of spaced deflecting arms mounted on the housing, with each one of the pair of spaced deflecting arms having an enlarged section at its free end;

a thumb actuator movably mounted to said housing;

a rod connected to the thumb actuator;

said thumb actuator operable to be moved to a first position whereat the deflecting arms are prevented from radial motion by said rod and operable to be moved to a second position whereat the deflecting arms are free to deflect.

* * * * *